United States Patent
Gao et al.

(10) Patent No.: US 11,605,951 B2
(45) Date of Patent: Mar. 14, 2023

(54) PHOTOVOLTAIC CONVERTER STRING, CONTROL METHOD, AND SYSTEM

(71) Applicant: Huawei Digital Power Technologies Co., Ltd., Shenzhen (CN)

(72) Inventors: Yongbing Gao, Shanghai (CN); Panpan Wang, Shenzhen (CN); Chengfeng Jiang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/362,119

(22) Filed: Jun. 29, 2021

(65) Prior Publication Data
US 2021/0328436 A1    Oct. 21, 2021

Related U.S. Application Data

(63) Continuation of application No. PCT/CN2019/080482, filed on Mar. 29, 2019.

(51) Int. Cl.
*H02J 3/38*     (2006.01)
*H02M 3/158*    (2006.01)

(52) U.S. Cl.
CPC ........... *H02J 3/381* (2013.01); *H02M 3/1582* (2013.01); *H02J 2300/26* (2020.01)

(58) Field of Classification Search
CPC ........ H02J 3/381; H02J 2300/26; H02J 1/102; H02J 2300/24; H02M 3/1582; H02M 1/32; H02M 1/0077; Y02E 10/56
See application file for complete search history.

(56) References Cited

U.S. PATENT DOCUMENTS

| | | | |
|---|---|---|---|
| 9,236,743 B2 | 1/2016 | Ahmed et al. | |
| 2009/0284232 A1* | 11/2009 | Zhang | G05F 1/67 322/89 |
| 2012/0043818 A1 | 2/2012 | Stratakos et al. | |

(Continued)

FOREIGN PATENT DOCUMENTS

| | | |
|---|---|---|
| CN | 103701329 A | 4/2014 |
| CN | 104660167 A | 5/2015 |

(Continued)

*Primary Examiner* — Toan T Vu
(74) *Attorney, Agent, or Firm* — Leydig, Voit & Mayer, Ltd.

(57) ABSTRACT

A photovoltaic converter string is provided, to control, one of switching transistors in a buck/boost circuit of the photovoltaic converter to be conducted, wherein the switching transistors are connected in parallel to a bypass diode; and control the other switching transistors in the buck/boost circuit to be cut off. Therefore, an output voltage of the photovoltaic converter is applied to both ends of the non-conducted switching transistor in the switching transistors connected in parallel to the bypass diode, and after the output voltage of the photovoltaic converter reaches a breakdown voltage of the non-conducted switching transistor, an avalanche breakdown occurs on the non-conducted switching transistor, and a voltage of both ends of the bypass diode connected to a positive output end and a negative output end of the photovoltaic converter is clamped to be less than or equal to the breakdown voltage of the switching transistor.

17 Claims, 10 Drawing Sheets

(56) References Cited

U.S. PATENT DOCUMENTS

2012/0206118 A1* 8/2012 Williams ................ H02J 3/381
                                                                                         323/282
2013/0320778 A1   12/2013  Hopf et al.
2018/0287484 A1   10/2018  Braginsky et al.

FOREIGN PATENT DOCUMENTS

| CN | 105743432 A | 7/2016 |
| CN | 106787707 A | 5/2017 |
| CN | 106953525 A | 7/2017 |
| CN | 206947565 U | 1/2018 |
| CN | 108448633 A | 8/2018 |
| DE | 102008059293 A1 | 6/2010 |
| JP | 2011507465 A | 3/2011 |
| JP | 2014128027 A | 7/2014 |

* cited by examiner

PHOTOVOLTAIC CONVERTER STRING, CONTROL METHOD, AND SYSTEM

CROSS-REFERENCE TO RELATED APPLICATIONS

This application is a continuation of International Application No. PCT/CN2019/080482, filed on Mar. 29, 2019, the disclosure of which is hereby incorporated by reference in its entirety.

TECHNICAL FIELD

Embodiments of the present invention relate to the field of photovoltaic power generation technologies, and in particular, to a photovoltaic converter string, a control method, and a system.

BACKGROUND

Photovoltaic power generation is a technology that uses a photovoltaic effect of a semiconductor interface to convert light energy into electric energy. A conventional distributed photovoltaic power system mainly includes photovoltaic modules, a controller, and an inverter. The photovoltaic modules are connected in series to form a photovoltaic string, and the photovoltaic string is connected to an input end of the inverter. However, because the photovoltaic modules are affected by factors such as different installation angles, different shades, hot spots, and inconsistent attenuation, voltage-current curves of a plurality of photovoltaic modules in a same photovoltaic string are inconsistent, in other words, a mismatch occurs between photovoltaic modules. Because of the mismatch between photovoltaic modules, each photovoltaic module in a same photovoltaic string cannot output maximum power of the photovoltaic module, and an energy yield of the entire photovoltaic system cannot reach the maximum accordingly. Therefore, to implement maximum power output, a photovoltaic converter is added to the photovoltaic system, and the photovoltaic converter can perform maximum power tracking on each photovoltaic module, so that each photovoltaic module outputs maximum power of the photovoltaic module.

In an actual application, a plurality of photovoltaic converters are connected in series to form a photovoltaic converter string. A plurality of photovoltaic converter strings may be connected in parallel and then connected to an input end of an inverter.

The following uses an example in which two photovoltaic converters are connected in series for description. FIG. 1 is a connection circuit diagram of a photovoltaic converter string according to the prior art.

A first photovoltaic converter 100 and a second photovoltaic converter 200 are connected in series, and there is a voltage on an inverter side. When the first photovoltaic converter 100 is hot-inserted due to a misoperation, series resonance generated by C2 and L2 causes an increase in a voltage between points C and D of the first photovoltaic converter 100. When the voltage exceeds a withstand voltage of a bypass diode D5 of the first photovoltaic converter 100, the bypass diode may be short-circuited, fail, and be damaged.

SUMMARY

To resolve the foregoing technical problem in the prior art, the present invention provides a photovoltaic converter string, a control method, and a system, to protect a bypass diode connected to an output end of a photovoltaic converter when the photovoltaic converter is inserted or removed.

According to a first aspect, this application provides a photovoltaic converter string, including a plurality of photovoltaic converters, where output ends of the plurality of photovoltaic converters are connected in series, and an input end of each of the photovoltaic converters is connected to a corresponding photovoltaic module; each photovoltaic converter includes a buck/boost circuit and a controller, an output capacitor is connected between a positive output end and a negative output end of the buck/boost circuit, and both ends of the output capacitor are connected in parallel to a bypass diode; and the controller is configured to: when the buck/boost circuit is in an off state, control, to be conducted, one of switching transistors in the buck/boost circuit that are connected in parallel to the bypass diode, and control the other switching transistors in the buck/boost circuit to be cut off, so that a voltage that the bypass diode withstands is less than or equal to a breakdown voltage of the non-conducted switching transistor.

Therefore, an output voltage of the photovoltaic converter is applied to both ends of the non-conducted switching transistor in the switching transistors connected in parallel to the bypass diode, and after the output voltage of the photovoltaic converter reaches the breakdown voltage of the non-conducted switching transistor, an avalanche breakdown occurs on the non-conducted switching transistor, the switching transistor undergoing the breakdown dissipates excess energy in a form of heat, and a voltage of both ends of the bypass diode connected to a positive output end and a negative output end of the photovoltaic converter is clamped to be less than or equal to the breakdown voltage of the switching transistor. In this way, the voltage that the bypass diode withstands is less than or equal to the breakdown voltage of the non-conducted switching transistor, thereby preventing the bypass diode from withstanding an excessively high output voltage and preventing the bypass diode from being damaged due to an excessively high output voltage.

In a first possible implementation of the first aspect, the buck/boost circuit includes at least a first switching transistor, a second switching transistor, a third switching transistor, and an inductor; a first end of the first switching transistor is connected to a positive input end of the buck/boost circuit, and a second end of the first switching transistor is connected to the positive output end of the buck/boost circuit by using the inductor and the second switching transistor that are sequentially connected in series to the second end of the first switching transistor; a first end of the third switching transistor is connected to a common end of the inductor and the second switching transistor, and a second end of the third switching transistor is connected to the negative output end of the buck/boost circuit; and a negative input end of the buck/boost circuit is connected to the negative output end of the buck/boost circuit.

The buck/boost circuit may be in a form of a buck-boost circuit, or may be a variant of a buck-boost circuit. A specific type of the buck/boost circuit is not limited in this embodiment of this application, provided that the buck/boost circuit can implement a boost function, a buck function, or a buck/boost function. It may be understood that the buck/boost circuit is a power conversion circuit, and can implement voltage conversion from one direct current to another.

With reference to either of the first aspect and the possible implementation, in a second possible implementation, that the controller controls one switching transistor in a boost circuit in the buck/boost circuit to be conducted, and controls the other switching transistors in the buck/boost circuit to be cut off is specifically that the controller controls the second switching transistor to be conducted, and controls both the first switching transistor and the third switching transistor to be cut off; or that the controller controls the third switching transistor to be conducted, and controls both the first switching transistor and the second switching transistor to be cut off.

According to a second aspect, a photovoltaic converter string is provided, including a plurality of photovoltaic converters, where output ends of the plurality of photovoltaic converters are connected in series, and an input end of each of the photovoltaic converters is connected to a corresponding photovoltaic module; each photovoltaic converter includes a buck/boost circuit and a controller, an output capacitor is connected between a positive output end and a negative output end of the buck/boost circuit, and both ends of the output capacitor are connected in parallel to a bypass diode; and the controller is configured to: when the buck/boost circuit is in an off state and it is determined that an output voltage of the buck/boost circuit is greater than or equal to a preset voltage, control energy of an output end of the buck/boost circuit to be reversely leaked to the correspondingly connected photovoltaic module, to reduce a voltage that the bypass diode withstands.

In this solution, energy of an output end of the photovoltaic converter may be leaked to the photovoltaic module connected to the input end, and an output voltage of the photovoltaic converter is clamped by using the photovoltaic module, so that the voltage that the bypass diode withstands is reduced.

In a first possible implementation of the second aspect, the buck/boost circuit includes a first switching transistor, a second switching transistor, a third switching transistor, and an inductor; a first end of the first switching transistor is connected to a positive input end of the buck/boost circuit, and a second end of the first switching transistor is connected to the positive output end of the buck/boost circuit by using the inductor and the second switching transistor that are sequentially connected in series to the second end of the first switching transistor; a first end of the third switching transistor is connected to a common end of the inductor and the second switching transistor, and a second end of the third switching transistor is connected to a negative input end of the buck/boost circuit; and the negative input end of the buck/boost circuit is connected to the negative output end of the buck/boost circuit.

The buck/boost circuit may be in a form of a buck-boost circuit, or may be a variant of a buck-boost circuit. A specific type of the buck/boost circuit is not limited in this embodiment of this application, provided that the buck/boost circuit can implement a boost function, a buck function, or a buck/boost function. It may be understood that the buck/boost circuit is a power conversion circuit, and can implement voltage conversion from one direct current to another.

With reference to either of the second aspect and the possible implementation, in a second possible implementation, that the controller controls energy of an output end of the buck/boost circuit to be reversely leaked to the correspondingly connected photovoltaic module is specifically that the controller controls both the first switching transistor and the second switching transistor to be conducted and both a fifth switching transistor and the third switching transistor to be cut off.

The energy of the output end is reversely leaked to the photovoltaic module connected to the input end, so that a channel is formed between the output end and the input end. As provided above, a channel is formed between the output end and the input end by controlling an on/off state of a switching transistor.

With reference to any one of the second aspect and the possible implementations, in a third possible implementation, that the controller controls energy of an output end of the buck/boost circuit to be reversely leaked to the corresponding photovoltaic module is specifically that the controller controls the first switching transistor to be conducted, controls the second switching transistor by using a first PWM wave, and controls the third switching transistor by using a second PWM wave, where the first PWM wave and the second PWM wave are mutually complementary.

The output end and the input end are specifically controlled to form a channel. A switching transistor is usually controlled by providing a driving pulse for a driving end of the switching transistor, in other words, is controlled by using a PWM wave.

With reference to any one of the second aspect and the possible implementations, in a forth possible implementation, that the controller controls energy of an output end of the buck/boost circuit to be reversely leaked to the correspondingly connected photovoltaic module is specifically that the controller controls the first switching transistor to be conducted, controls both a fifth switching transistor and the third switching transistor to be cut off, and controls the second switching transistor by using a third PWM wave.

According to a third aspect, a method for controlling a photovoltaic converter string is provided, where the method is used to control a photovoltaic converter string, the photovoltaic converter string includes a plurality of photovoltaic converters, output ends of the plurality of photovoltaic converters are connected in series, an input end of each of the photovoltaic converters is connected to a corresponding photovoltaic module, each photovoltaic converter includes a buck/boost circuit and a controller, an output capacitor is connected between a positive output end and a negative output end of the buck/boost circuit, and both ends of the output capacitor are connected in parallel to a bypass diode; and the method includes: when the buck/boost circuit is in an off state, controlling, to be conducted, one of switching transistors in the buck/boost circuit that are connected in parallel to the bypass diode, and controlling the other switching transistors in the buck/boost circuit to be cut off, so that a voltage that the bypass diode withstands is less than or equal to a breakdown voltage of the non-conducted switching transistor.

Therefore, an output voltage of the photovoltaic converter is applied to both ends of the non-conducted switching transistor in the switching transistors connected in parallel to the bypass diode, and after the output voltage of the photovoltaic converter reaches the breakdown voltage of the non-conducted switching transistor, an avalanche breakdown occurs on the non-conducted switching transistor, the switching transistor undergoing the breakdown dissipates excess energy in a form of heat, and a voltage of both ends of the bypass diode connected to a positive output end and a negative output end of the photovoltaic converter is clamped to be less than or equal to the breakdown voltage of the switching transistor. In this way, the voltage that the bypass diode withstands is less than or equal to the breakdown voltage of the non-conducted switching transistor, thereby preventing the bypass diode from withstanding an excessively high output voltage and preventing the bypass diode from being damaged due to an excessively high output voltage.

According to a fourth aspect, a method for controlling a photovoltaic converter string is provided, where the method is used to control a photovoltaic converter string, the photovoltaic converter string includes a plurality of photovoltaic converters, output ends of the plurality of photovoltaic converters are connected in series, an input end of each of the photovoltaic converters is connected to a corresponding photovoltaic module, each photovoltaic converter includes a buck/boost circuit and a controller, an output capacitor is connected between a positive output end and a negative output end of the buck/boost circuit, and both ends of the output capacitor are connected in parallel to a bypass diode; and the method includes: when the buck/boost circuit is in an off state and it is determined that an output voltage of the buck/boost circuit is greater than or equal to a preset voltage, controlling energy of an output end of the buck/boost circuit to be reversely leaked to the correspondingly connected photovoltaic module, to reduce a voltage that the bypass diode withstands.

In the method, energy of an output end of the photovoltaic converter may be leaked to the photovoltaic module connected to the input end, and an output voltage of the photovoltaic converter is clamped by using the photovoltaic module, so that the voltage that the bypass diode withstands is reduced.

According to a fifth aspect, a photovoltaic system is provided, including the photovoltaic converter string according to the first aspect or the photovoltaic converter string according to the second aspect, and further including an inverter, where output ends of a plurality of photovoltaic converter strings are connected in parallel and connected to an input end of the inverter.

Because the photovoltaic system includes the foregoing photovoltaic converter, when a bypass diode in the photovoltaic converter is protected, the entire photovoltaic system is not shut down, so that the photovoltaic system has higher operation efficiency.

Compared with the prior art, the present invention has at least the following advantages:

To prevent a bypass diode connected to an output end from being damaged when a photovoltaic converter string is connected due to a misoperation, one of switching transistors in a buck/boost circuit of a photovoltaic converter that are connected in parallel to the bypass diode may be controlled to be conducted, and the other switching transistors in the buck/boost circuit of the photovoltaic converter may also be controlled to be cut off. Therefore, an output voltage of the photovoltaic converter is applied to both ends of the non-conducted switching transistor in the switching transistors connected in parallel to the bypass diode, and after the output voltage of the photovoltaic converter reaches a breakdown voltage of the non-conducted switching transistor, an avalanche breakdown occurs on the non-conducted switching transistor, the switching transistor undergoing the breakdown dissipates excess energy in a form of heat, and a voltage of both ends of the bypass diode connected to a positive output end and a negative output end of the photovoltaic converter is clamped to be less than or equal to the breakdown voltage of the switching transistor. In this way, the voltage that the bypass diode withstands is less than or equal to the breakdown voltage of the non-conducted switching transistor, thereby preventing the bypass diode from withstanding an excessively high output voltage and preventing the bypass diode from being damaged due to an excessively high output voltage.

In addition, this application further provides a photovoltaic converter string. When it is determined that an output voltage of a buck/boost circuit is greater than or equal to a preset voltage, energy of an output end of the buck/boost circuit is controlled to be reversely leaked to a corresponding photovoltaic module, in other words, energy of an output end of a photovoltaic converter is controlled to be leaked to the photovoltaic module connected to an input end, and an output voltage of the photovoltaic converter is clamped by using the photovoltaic module, so that a voltage that a bypass diode withstands is reduced.

BRIEF DESCRIPTION OF DRAWINGS

To describe the technical solutions in the embodiments of this application or in the prior art more clearly, the following briefly describes the accompanying drawings required for describing the embodiments or the prior art. Clearly, the accompanying drawings in the following description show some embodiments of this application, and a person of ordinary skill in the art may still derive other drawings from these accompanying drawings without creative efforts.

DESCRIPTION OF EMBODIMENTS

Figure 1:
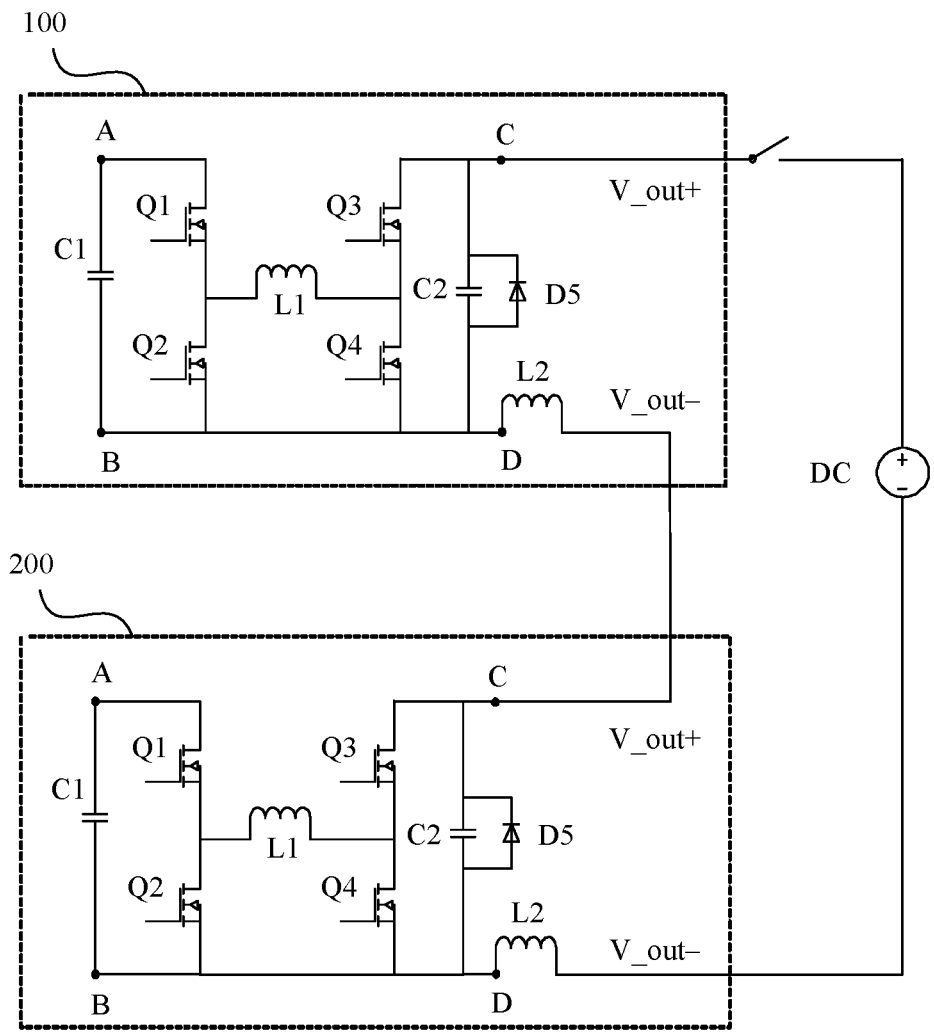
FIG. 1 is a connection circuit diagram of converters according to the prior art.

In a distributed photovoltaic power system, a plurality of photovoltaic converters are connected in series to form a photovoltaic converter string, and a plurality of converter strings may be connected in parallel and then connected to a large-capacity capacitor of a single-stage inverter. Because the large-capacity capacitor of the inverter stores energy and is equivalent to a voltage source, when the photovoltaic converter is hot-inserted for connection, a capacitor and an inductor at an output end of the photovoltaic converter generate series resonance, and the voltage source is used as a stepped voltage source of the series resonance. In this case, a voltage applied to a bypass diode is quite high and exceeds a withstand voltage of the bypass diode. Consequently, the bypass diode is damaged. Because output ends of the plurality of photovoltaic converters are connected in series, when a bypass diode of one photovoltaic converter is damaged, bypass diodes in other photovoltaic converters connected in series to the photovoltaic converter are also damaged.

In this application, to resolve the foregoing technical problem, to be specific, to avoid damage to a bypass diode that is caused by hot-inserting a photovoltaic converter, a switching transistor in a boost circuit may be controlled to be conducted, another switching transistor may be controlled to be cut off, and an output voltage of the photovoltaic converter is applied to both ends of the non-conducted switching transistor in the boost circuit. When the output voltage reaches a breakdown voltage of the switching transistor, a breakdown occurs on the switching transistor. In this case, a voltage that the bypass diode withstands is restricted within a range of the breakdown voltage. In this way, the bypass diode is prevented from withstanding an excessively high output voltage, and therefore, the bypass diode is prevented from being damaged due to an excessively high output voltage.

To make a person skilled in the art understand the technical solutions in the present invention better, the following clearly and describes the technical solutions in the embodiments of the present invention with reference to the accompanying drawings in the embodiments of the present invention. It is clearly that the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Embodiment 1 of this application provides a photovoltaic converter string. The photovoltaic converter string includes a plurality of photovoltaic converters, output ends of the plurality of photovoltaic converters are connected in series, and an input end of each of the photovoltaic converters is connected to a corresponding photovoltaic module. In other words, photovoltaic converters are in a one-to-one correspondence with photovoltaic modules. A quantity of photovoltaic converters included in the photovoltaic converter string is not specifically limited in this application. In an actual distributed photovoltaic power system, one inverter may correspond to one photovoltaic converter string, or one inverter may correspond to a plurality of photovoltaic converter strings. When one inverter corresponds to a plurality of photovoltaic converter strings, output ends of the plurality of photovoltaic converter strings are connected in parallel and connected to an output end of the inverter.

For ease of description, the following uses an example in which a photovoltaic converter string includes at least the following two photovoltaic converters: a first photovoltaic converter and a second photovoltaic converter. "first" and "second" are merely used to distinguish between two photovoltaic converters for ease of description, and do not constitute a limitation on this application.

Figure 2:
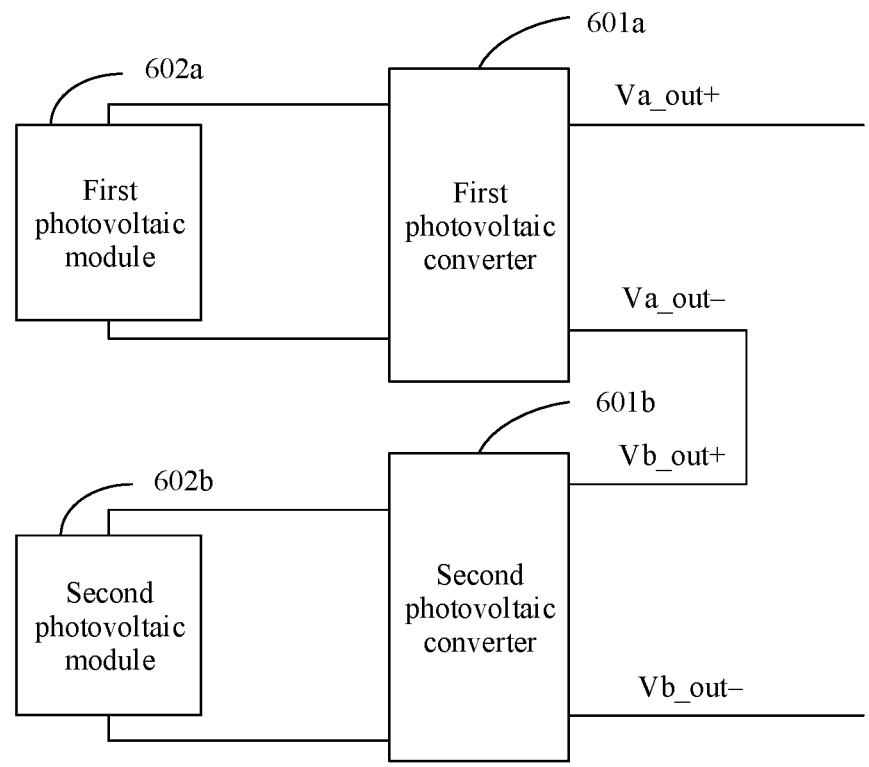
FIG. 2 is a circuit diagram of a photovoltaic converter string according to Embodiment 1 of this application.

FIG. 2 is a schematic structural diagram of a photovoltaic converter string according to Embodiment 1 of this application.

The photovoltaic converter string 300 includes a first photovoltaic converter 301a and a second photovoltaic converter 301b. An input end of the first photovoltaic converter 301a is connected to a first photovoltaic module 302a, an input end of the second photovoltaic converter 301b is connected to a second photovoltaic module 302b, and an output end of the first photovoltaic converter 301a and an output end of the second photovoltaic converter 301b are connected in series. As shown in the figure, a negative output end Va_out− of the first photovoltaic converter 301a is connected to a positive output end Vb_out+ of the second photovoltaic converter 301b. A positive output end Va_out+ of the first photovoltaic converter 301a is used as a positive output end of the photovoltaic converter string, and a negative output end Vb_out− of the second photovoltaic converter 301b is used as a negative output end of the photovoltaic converter string.

Because structures of the first photovoltaic converter 301a and the second photovoltaic converter 301b are the same, the following uses the first photovoltaic converter 301a as an example for description.

Figure 3:
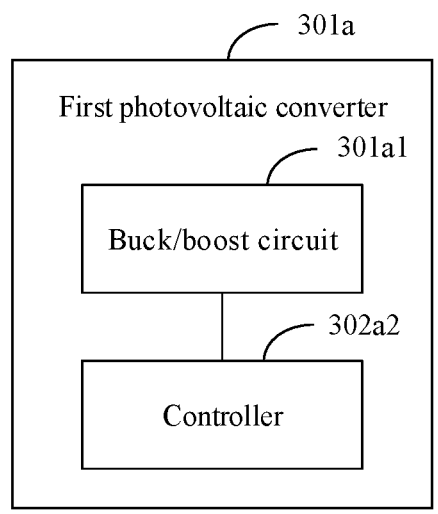
FIG. 3 is a schematic structural diagram of a first photovoltaic converter in the photovoltaic converter string corresponding to FIG. 2.

FIG. 3 is a schematic structural diagram of the first photovoltaic converter in the photovoltaic converter string corresponding to FIG. 2.

The first photovoltaic converter 301a includes a buck/boost circuit 301a1 and a controller 302a2.

When the buck/boost circuit is in an off state, the controller 302a2 controls, to be conducted, one switching transistor in switching transistors in the buck/boost circuit 301a1 that are connected in parallel to the bypass diode, and also controls the other switching transistors in the buck/boost circuit to be cut off, so that a voltage that the bypass diode withstands is less than or equal to a breakdown voltage of the non-conducted switching transistor. It should be noted that the controller needs to complete the foregoing control process before a photovoltaic power system is started to output a voltage.

That the buck/boost circuit is in an off state means that the controller included in the photovoltaic converter has not received a start instruction sent by a host computer, and the host computer is a controller of an inverter.

There may be at least two switching transistors on an output side of the buck/boost circuit 301a1 that are connected in parallel to the bypass diode. A clamping function for the bypass diode can be implemented provided that one of the switching transistors is controlled to be conducted and the other switching transistors are controlled to be cut off. For example, if there are two switching transistors connected in parallel to the bypass diode, one switching transistor is controlled to be conducted, and the other switching transistor is controlled to be cut off, where being cut off means being non-conducted, so that the voltage that the bypass diode withstands is less than or equal to a breakdown voltage of the non-conducted switching transistor.

The buck/boost circuit may be implemented by using a buck-boost circuit. It should be noted that the buck-boost circuit may operate in a boost mode, or may operate in a buck mode, or may operate in a buck-first and boost-next mode. A specific operation mode is not specifically limited in this embodiment of this application.

It should be noted that all switching transistors in a boost circuit in the buck/boost circuit 301a1 are MOS field-effect transistors (MOSFET).

To prevent a bypass diode connected to an output end from being damaged when a photovoltaic converter string is connected due to a misoperation, one of switching transistors in a buck/boost circuit of a photovoltaic converter that are connected in parallel to the bypass diode may be controlled to be conducted, and the other switching transistors in the buck/boost circuit of the photovoltaic converter may also be controlled to be cut off. In other words, a switching transistor in a buck circuit is controlled to be cut off, one switching transistor that is on an output side of the buck/boost circuit and that is connected in parallel to the bypass diode is controlled to be conducted, and another switching transistor connected in parallel to the bypass diode is controlled to be cut off. Therefore, an output voltage of the photovoltaic converter is applied to both ends of the non-conducted switching transistor on the output side, and after the output voltage of the photovoltaic converter reaches a breakdown voltage of the non-conducted switching transistor, an avalanche breakdown occurs on the non-conducted switching transistor, the switching transistor undergoing the breakdown dissipates excess energy in a form of heat, and a voltage of both ends of the bypass diode connected to a positive output end and a negative output end of the photovoltaic converter is clamped to be less than or equal to the breakdown voltage of the switching transistor. In this way, the voltage that the bypass diode withstands is less than or equal to the breakdown voltage of the non-conducted switching transistor, thereby preventing the bypass diode from withstanding an excessively high output voltage and preventing the bypass diode from being damaged due to an excessively high output voltage.

Embodiment 2

In a photovoltaic converter provided in Embodiment 2 of this application, an example in which a buck/boost circuit is a buck-boost circuit is used for description. The buck-boost circuit includes at least a first switching transistor, a second switching transistor, a third switching transistor, and an inductor. The following provides detailed descriptions with reference to the accompanying drawings.

Figure 4A:
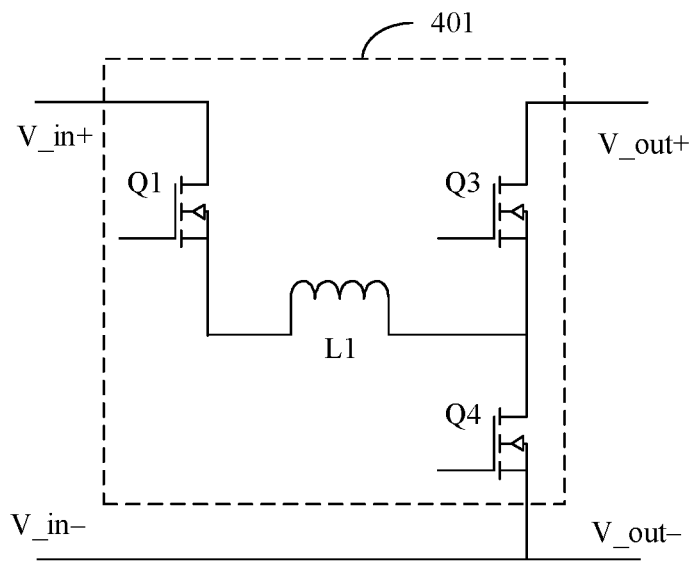
FIG. 4a is a circuit diagram of a buck-boost circuit according to Embodiment 2 of this application.

FIG. 4a is a circuit diagram of a buck-boost circuit according to Embodiment 2 of this application.

The buck-boost circuit 401 includes at least a first switching transistor Q1, a second switching transistor Q3, a third switching transistor Q4, and a first inductor L1. The second switching transistor Q3 and the third switching transistor Q4 each may be a MOS field-effect transistor, and the first switching transistor Q1 may be a MOS field-effect transistor, or may be another type of switching transistor. This is not specifically limited in this application.

A first end of the first switching transistor Q1 is connected to a positive input end V_in+ of the buck-boost circuit 401, and a second end of the first switching transistor Q1 is connected to a positive output end V_out+ of the buck-boost circuit 401 by using the first inductor L1 and the second switching transistor Q3 that are sequentially connected in series to the second end of the first switching transistor Q1.

A first end of the third switching transistor Q4 is connected to a common end of the first inductor L1 and the second switching transistor Q3, and a second end of the third switching transistor Q4 is connected to a negative output end V_out− of the buck-boost circuit.

A negative input end V_in− of the buck-boost circuit 401 is connected to the negative output end V_out− of the buck-boost circuit 401.

Figure 4B:
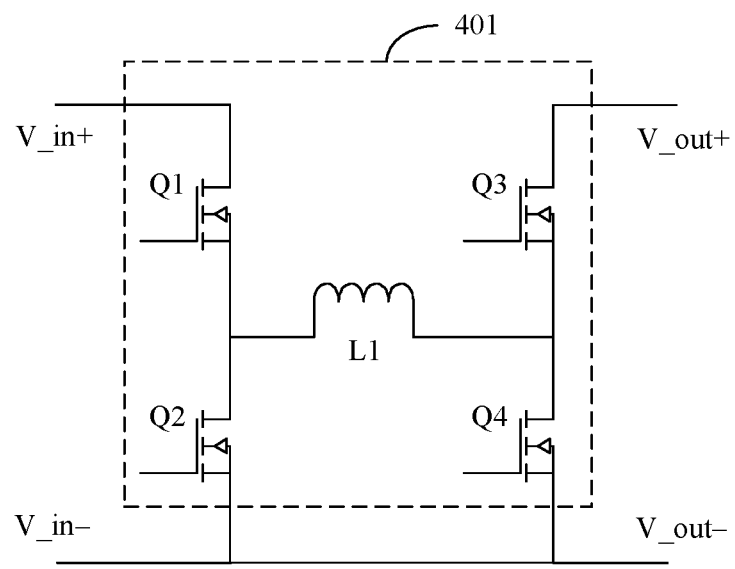
FIG. 4b is a circuit diagram of another buck-boost circuit according to Embodiment 2 of this application.

In addition, the buck-boost circuit 401 may further include a fifth switching transistor. As shown in FIG. 4b, a first end of the fifth switching transistor Q2 is connected to a common end of the first switching transistor Q1 and the first inductor L1, and a second end of the fifth switching transistor Q2 is connected to the negative input end V_in− of the buck-boost circuit 401.

Switching transistors included in a boost circuit in the buck-boost circuit 401 are the second switching transistor Q3 and the third switching transistor Q4. Switching transistors included in a buck circuit in the buck-boost circuit 401 are the first switching transistor Q1 and the fifth switching transistor Q2.

The following describes an operating principle when a photovoltaic converter in a photovoltaic converter string is a buck-boost circuit.

The following describes a principle of controlling operation of a buck-boost circuit by a controller in a single photovoltaic converter, and other photovoltaic converters have similar operating principles. Refer to the photovoltaic converter.

Figure 5:
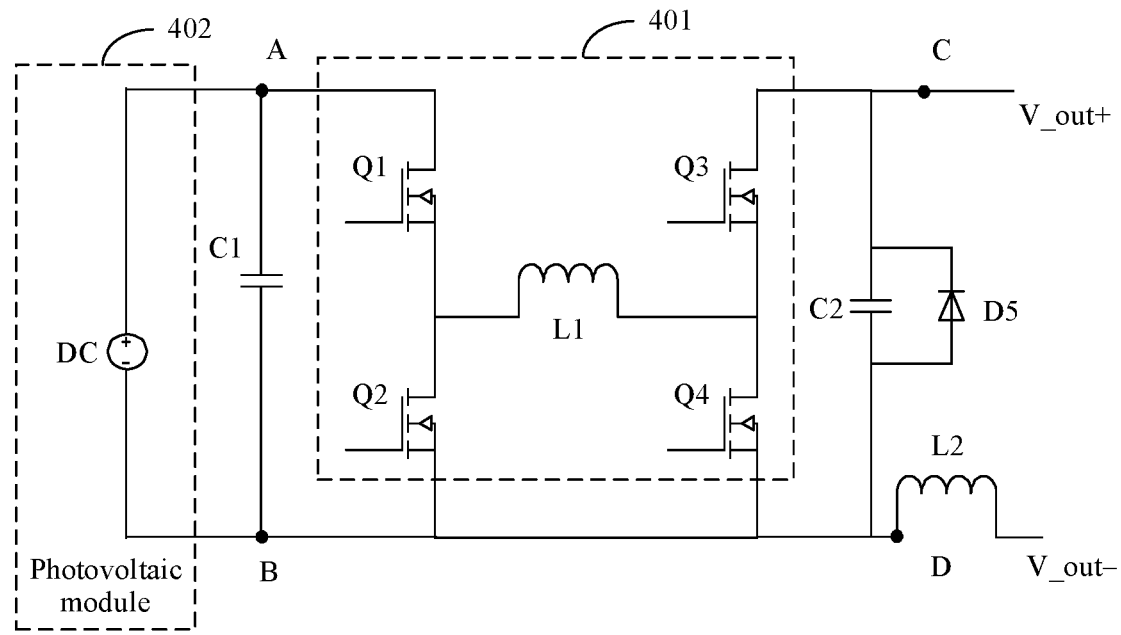
FIG. 5 is a circuit diagram of a photovoltaic converter according to Embodiment 2 of this application.

FIG. 5 is a circuit diagram of a photovoltaic converter according to Embodiment 2 of this application.

The photovoltaic converter includes a buck-boost circuit 401 and a controller. The controller is not shown in the figure.

An input end of the buck-boost circuit 401 is connected to a photovoltaic module 402. Because the photovoltaic module 402 outputs a direct current, the photovoltaic module 402 may be used as a direct current power.

To protect a bypass diode, one switching transistor in a boost circuit may be controlled to be conducted, and the other switching transistors may be controlled to be cut off. The following describes an operating principle by conducting a second switching transistor Q3 or a third switching transistor Q4 in the boost circuit. A case in which the second switching transistor Q3 is conducted and a first switching transistor Q1, a fifth switching transistor Q2, and the third switching transistor Q4 are cut off is first described.

It may be understood that controlling the second switching transistor Q3 to be conducted means that the controller sends a drive signal to a control end of the second switching transistor Q3. The drive signal is usually a PWM wave. Controlling the third switching transistor Q4 to be cut off means that the controller does not send a drive signal to a control end of the third switching transistor Q4. When the third switching transistor Q4 is non-conducted, if a voltage applied to both ends of the third switching transistor Q4 is greater than a preset threshold, a current may also pass through the third switching transistor Q4.

Figure 6:
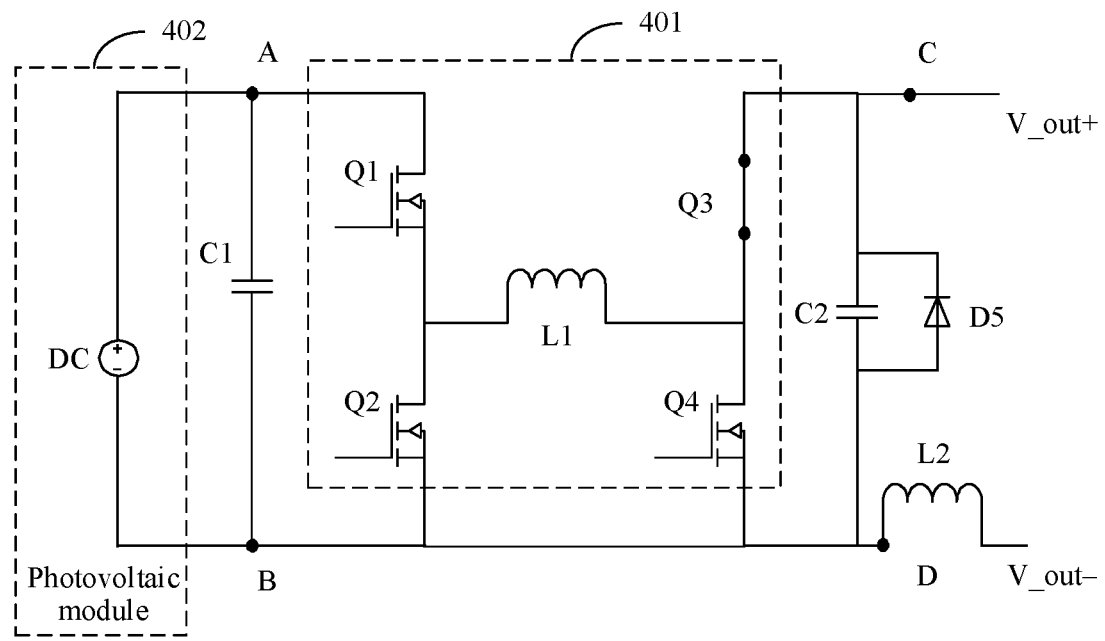
FIG. 6 is an equivalent circuit diagram of a photovoltaic converter according to Embodiment 2 of this application.

FIG. 6 is an equivalent circuit diagram of a photovoltaic converter according to Embodiment 2 of this application.

Based on the photovoltaic converter provided in FIG. 5, to prevent a bypass diode D5 from being broken down when the photovoltaic converter is hot-inserted, after an input voltage of the photovoltaic converter is applied, a voltage is output from the photovoltaic module connected to the input end of the photovoltaic converter. Before the controller of the photovoltaic converter receives a start instruction sent by an inverter, in other words, before the photovoltaic converter is started and operates, the controller needs to control the second switching transistor Q3 in the boost circuit in the buck-boost circuit to be conducted and the first switching transistor Q1, the fifth switching transistor Q2, and the third switching transistor Q4 to be cut off. In this case, the circuit provided in FIG. 5 may be equivalent to that shown in FIG. 6.

When the photovoltaic converter is hot-inserted into the circuit due to a misoperation, because there is a voltage on an inverter side connected to an output end of the photovoltaic converter, a capacitor C2 and an inductor L2 at the output end of the photovoltaic converter generate series resonance, causing an increase in a voltage between two points C and D. When the voltage between the two points C and D reaches a breakdown voltage of the third switching transistor Q4, an avalanche breakdown occurs on the third switching transistor Q4, so that the voltage between the two points C and D is restricted to be less than or equal to the breakdown voltage of the third switching transistor Q4. When the voltage between C and D exceeds the breakdown voltage of the third switching transistor Q4, provided that the third switching transistor Q4 is still in a safe operating area, the third switching transistor Q4 undergoing the avalanche can dissipate energy in the series resonant circuit in a form of heat, so that the voltage between C and D is reduced to the breakdown voltage of the third switching transistor Q4, and a voltage that the bypass diode D5 withstands is restricted to be less than or equal to the breakdown voltage of the third switching transistor Q4, thereby preventing the bypass diode D5 from being damaged because the bypass diode D5 withstands an excessively high output voltage.

The following describes a case in which a controller controls a third switching transistor Q4 in a boost circuit to be conducted and a second switching transistor Q3 to be cut off.

Figure 7:
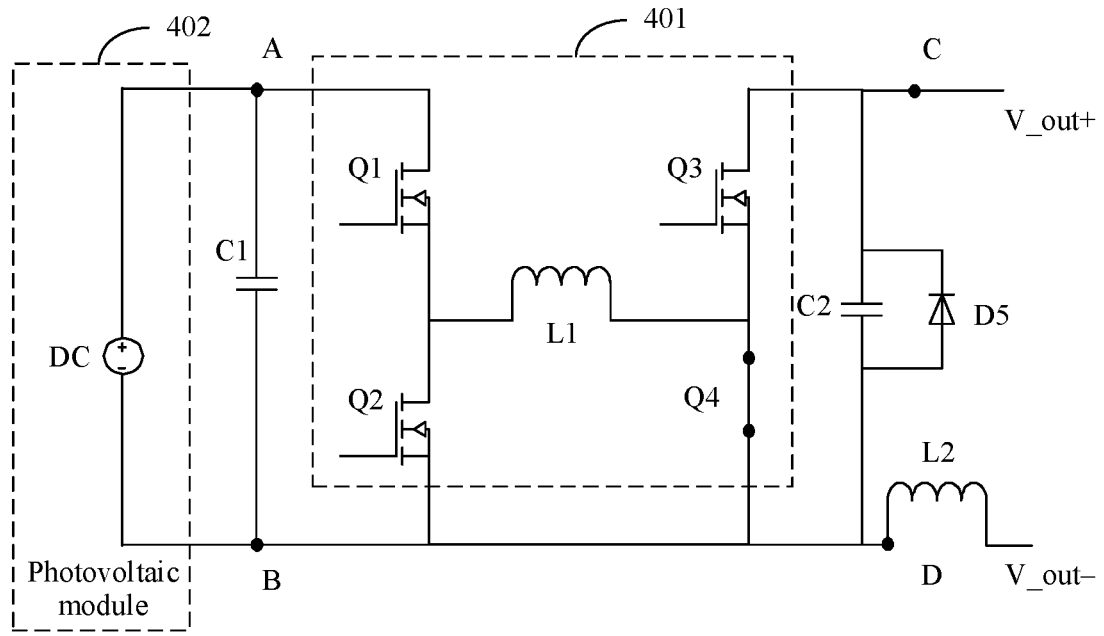
FIG. 7 is an equivalent circuit diagram of another photovoltaic converter according to Embodiment 2 of this application.

FIG. 7 is an equivalent circuit diagram of another photovoltaic converter according to Embodiment 2 of this application.

A controller controls a third switching transistor Q4 in a boost circuit in a buck-boost circuit to be conducted and a first switching transistor Q1, a fifth switching transistor Q2, and a second switching transistor Q3 to be cut off. In this case, the circuit provided in FIG. 5 may be equivalent to that shown in FIG. 7.

When the photovoltaic converter is hot-inserted into the circuit due to a misoperation, because both the first switching transistor Q1 and the fifth switching transistor Q2 are cut off, a voltage provided by a photovoltaic module 402 cannot be loaded onto both sides of a bypass diode D5. Because there is a voltage on an inverter side connected to an output end of the photovoltaic converter, a capacitor C2 and an inductor L2 at the output end of the photovoltaic converter generate series resonance, causing an increase in a voltage between two points C and D. When the voltage between the two points C and D reaches a breakdown voltage of the second switching transistor Q3, an avalanche breakdown occurs on the second switching transistor Q3, so that the voltage between the two points C and D is restricted to be less than or equal to the breakdown voltage of the second switching transistor Q3. When the voltage between C and D exceeds the breakdown voltage of the second switching transistor Q3, provided that the second switching transistor Q3 is still in a safe operating area, the second switching transistor Q3 undergoing the avalanche can dissipate energy in the series resonant circuit in a form of heat, so that the voltage between C and D is reduced to the breakdown voltage of the second switching transistor Q3, and a voltage that the bypass diode D5 withstands is restricted to be less than or equal to the breakdown voltage of the second switching transistor Q3, thereby preventing the bypass diode D5 from being damaged because the bypass diode D5 withstands an excessively high output voltage.

Embodiment 3

Embodiment 3 of this application further provides another photovoltaic converter string. The photovoltaic converter string includes a plurality of photovoltaic converters, output ends of the plurality of photovoltaic converters are connected in series, and an input end of each of the photovoltaic converters is connected to a corresponding photovoltaic module. In other words, photovoltaic converters are in a one-to-one correspondence with photovoltaic modules. A quantity of photovoltaic converters included in the photovoltaic converter string is not specifically limited in this application. In an actual distributed photovoltaic power system, one inverter may correspond to one photovoltaic converter string, or one inverter may correspond to a plurality of photovoltaic converter strings. When one inverter corresponds to a plurality of photovoltaic converter strings, output ends of the plurality of photovoltaic converter strings are connected in parallel and connected to an output end of the inverter.

For ease of description, the following uses an example in which a photovoltaic converter string includes at least the following two photovoltaic converters: a first photovoltaic converter and a second photovoltaic converter. "first" and "second" are merely used to distinguish between two photovoltaic converters for ease of description, and do not constitute a limitation on this application.

For a specific structure of the photovoltaic converter string in this embodiment, still refer to FIG. 2. Details are not described herein again Because structures of a first photovoltaic converter 601a and a second photovoltaic converter 601b are the same, the following uses the first photovoltaic converter 601a as an example for description.

Figure 8:
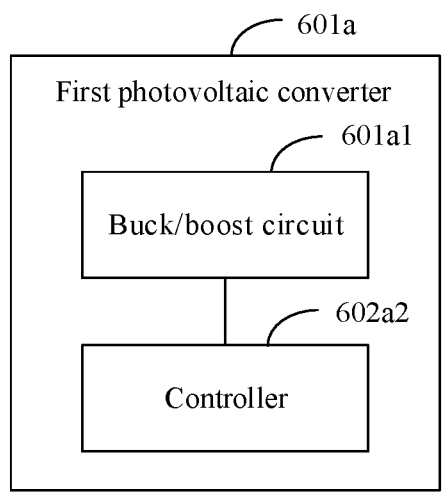
FIG. 8 is a schematic structural diagram of a first photovoltaic converter in a photovoltaic converter string according to Embodiment 3 of this application.

FIG. 8 is a schematic structural diagram of a first photovoltaic converter in a photovoltaic converter string according to Embodiment 3 of this application.

The first photovoltaic converter 601a includes a buck-boost circuit 601a1 and a controller 602a2.

The controller 602a2 is configured to: when the buck/boost circuit is in an off state and it is determined that an output voltage of the buck-boost circuit 601a1 is greater than or equal to a preset voltage, control the buck-boost circuit 601a1 to reversely leak energy of an output end to a corresponding first photovoltaic module 602a, and dissipate excess energy of the output end in a form of heat by using the first photovoltaic module 602a.

To prevent a bypass diode from being broken down because the bypass diode withstands an excessively high voltage, the preset voltage should be less than a breakdown voltage of the bypass diode.

For a specific leakage path, a switching transistor in the photovoltaic converter may be controlled to be conducted or cut off, so that a channel is formed between an output end and an input end. For example, through controlling, the buck-boost circuit may operate in a reverse buck mode, in other words, the output end of the photovoltaic converter transfers energy to the input end in a buck mode.

In the photovoltaic converter string in Embodiment 3 of this application, when it is determined that an output voltage of a buck-boost circuit is greater than or equal to a preset voltage, energy of an output end of the buck-boost circuit is controlled to be reversely leaked to a corresponding photovoltaic module, in other words, energy of an output end of a photovoltaic converter is controlled to be leaked to the photovoltaic module connected to an input end, and an output voltage of the photovoltaic converter is clamped by using the photovoltaic module, so that a voltage that a bypass diode withstands is reduced.

Embodiment 4

The following uses an example in which a photovoltaic converter is a buck-boost circuit to describe a specific implementation of leaking energy of an output end to an input end.

For a specific circuit diagram of the buck-boost circuit, refer to descriptions corresponding to FIG. 4. Details are not described herein again.

A controller is configured to: when the buck/boost circuit is in an off state and it is determined that an output voltage of the buck-boost circuit is greater than or equal to a preset voltage, control an on/off state of each switching transistor in the circuit, so that the buck-boost circuit reversely leaks energy of an output end to a photovoltaic module connected to an input end. The following first describes a principle in which the controller controls a first switching transistor Q1 and a second switching transistor Q2 to be conducted, and also controls a fifth switching transistor Q2 and a third switching transistor Q4 to be cut off, so that a channel is formed between the output end and the input end, and then the energy is reversely leaked.

It may be understood that the controller sends a drive signal to a control end of a switching transistor to control the switching transistor to be conducted or cut off. For example, when the drive signal is a PWM wave, if the controller controls a switching transistor to be conducted, the controller sends a PWM wave with a duty cycle of 100% to a control end of the switching transistor; or if the controller controls a switching transistor to be cut off, the controller does not send a PWM wave to a control end of the switching transistor.

Figure 9:
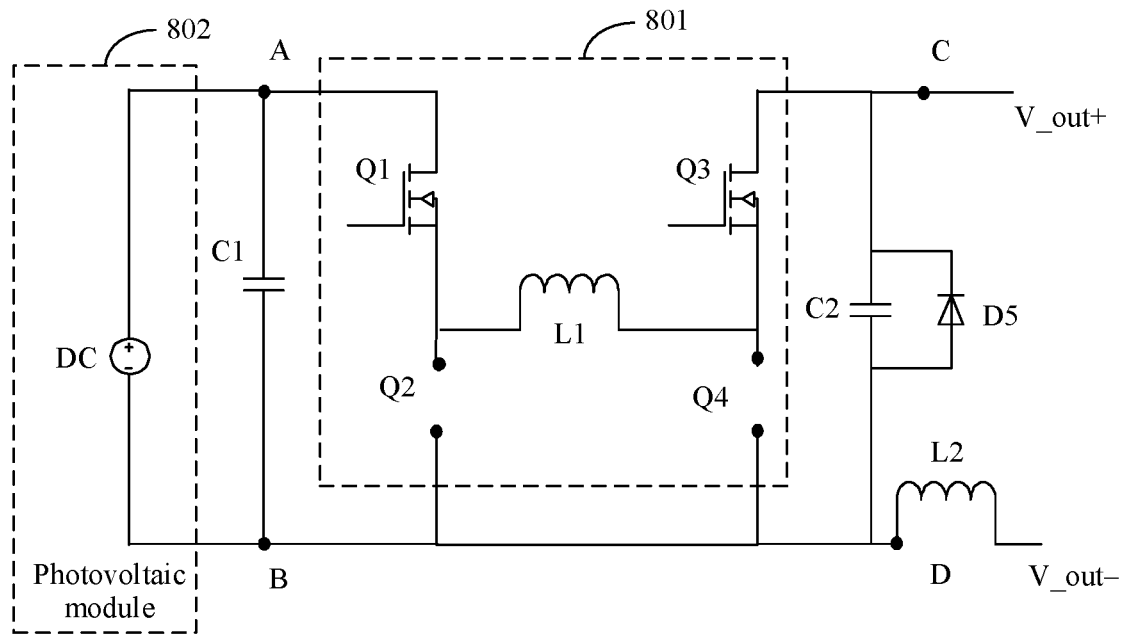
FIG. 9 is an equivalent circuit diagram of another photovoltaic converter according to Embodiment 4 of this application.

FIG. 9 is an equivalent circuit diagram of another photovoltaic converter according to Embodiment 4 of this application.

To prevent a bypass diode D5 from being broken down when the photovoltaic converter is hot-inserted, when a controller determines that an output voltage of a buck-boost circuit 801 is greater than or equal to a preset voltage, the controller needs to control a first switching transistor Q1 and a second switching transistor Q3 in the buck-boost circuit 801 to be conducted, and control a fifth switching transistor Q2 and a third switching transistor Q4 to be cut off.

It should be noted that the output voltage of the buck-boost circuit 801 may be implemented by using a voltage detection circuit. The voltage detection circuit sends the detected output voltage to the controller, and the controller determines whether the output voltage is greater than or equal to the preset voltage. Because the voltage detection circuit is relatively mature, details are not described herein.

When the photovoltaic converter is hot-inserted into the circuit due to a misoperation, because there is a voltage on an inverter side connected to an output end of the photovoltaic converter, a capacitor C2 and an inductor L2 at the output end of the photovoltaic converter generate series resonance, causing an increase in a voltage between two points C and D. When the controller determines that the voltage between the two points C and D is greater than the preset voltage, the controller controls the first switching transistor Q1 and the second switching transistor Q2 to be conducted, so that resonance energy of the output end is reversely leaked to a photovoltaic module 802, and therefore, the voltage between C and D is reduced to the preset voltage. In this way, a voltage that the bypass diode D5 withstands is restricted to be less than or equal to the preset voltage, thereby preventing the bypass diode D5 from being damaged because the bypass diode D5 withstands an excessively high output voltage.

The foregoing describes the case in which Q3 and Q1 are controlled to be conducted, so that a channel is formed between the output end and the input end of the photovoltaic converter, and then the energy of the output end is leaked to the input end. The following describes another implementation in which a channel is formed between the output end and the input end of the photovoltaic converter. For example, when the controller determines that the output voltage of the buck-boost circuit is greater than or equal to the preset voltage, the controller may further control the buck-boost circuit to operate in a reverse buck mode, so that the buck-boost circuit reversely leaks the energy of the output end to the photovoltaic module.

The following first describes a case in a first reverse buck operating mode in which a controller controls a first switching transistor Q1 to be conducted, controls a fifth switching transistor Q2 to be cut off, controls a second switching transistor Q3 by using a first PWM wave, and controls a third switching transistor Q4 by using a second PWM wave. Duty cycles of the first PWM wave and the second PWM wave may be the same or different. This is not specifically limited in this application.

Figure 10:
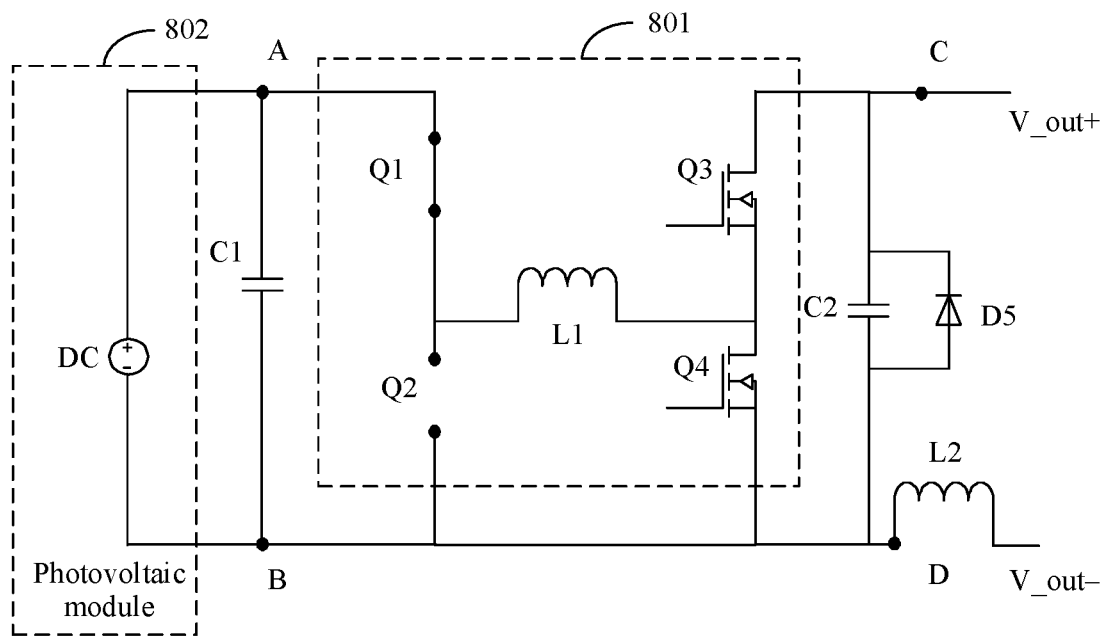
FIG. 10 is an equivalent circuit diagram of still another photovoltaic converter according to Embodiment 4 of this application.

FIG. 10 is an equivalent circuit diagram of still another photovoltaic converter according to Embodiment 4 of this application.

To prevent a bypass diode D5 from being broken down when the photovoltaic converter is hot-inserted, when a controller determines that an output voltage of a buck-boost circuit 801 is greater than or equal to a preset voltage, the controller controls a first switching transistor Q1 in the buck-boost circuit 801 to remain conducted, and controls a fifth switching transistor Q2 to remain cut off, as shown in FIG. 10.

When the photovoltaic converter is hot-inserted into the circuit due to a misoperation, because there is a voltage on an inverter side connected to an output end of the photovoltaic converter, a capacitor C2 and an inductor L2 at the output end of the photovoltaic converter generate series resonance, causing an increase in a voltage between two points C and D. When the controller determines that the voltage between the two points C and D is greater than the preset voltage, the controller controls the first switching transistor Q1 in the buck-boost circuit 801 to remain conducted, controls the fifth switching transistor Q2 to remain cut off, controls a second switching transistor Q3 by using a first PWM wave, and controls a third switching transistor Q4 by using a second PWM wave, in other words, the controller is configured to control the buck-boost circuit to operate in a reverse buck mode, so that resonance energy of the output end of the buck-boost circuit 801 is reversely leaked to a photovoltaic module 802, and therefore, the voltage between C and D is reduced to the preset voltage. In this way, a voltage that the bypass diode D5 withstands is restricted to be less than or equal to the preset voltage, thereby preventing the bypass diode D5 from being damaged because the bypass diode D5 withstands an excessively high output voltage.

In addition, when the controller controls the second switching transistor Q3 and the third switching transistor Q4, the following case needs to be avoided: The two switching transistors are conducted at the same time, and consequently, there is a short circuit between a positive output end and a negative output end of the photovoltaic converter.

For example, when a PWM wave is at a high level, a switching transistor is controlled to be conducted; or when a PWM wave is at a low level, a switching transistor is controlled to be cut off. In this case, reference may be made to a waveform diagram of a first PWM wave and a second PWM wave shown in FIG. 11. To prevent the second switching transistor Q3 and the third switching transistor Q4 from being conducted at the same time, waveforms corresponding to the first PWM wave and the second PWM wave cannot be at a high level at the same time.

Figure 12:
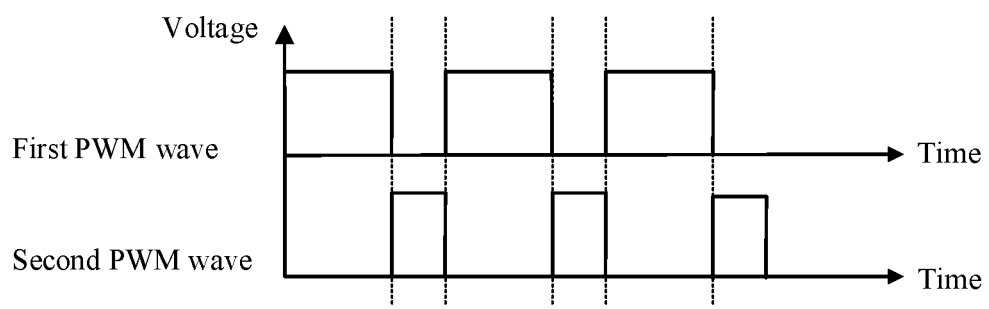
FIG. 12 is a waveform diagram in which a first PWM wave and a second PWM are mutually complementary.

FIG. 12 is a waveform diagram in which a first PWM wave and a second PWM are mutually complementary.

Figure 11:
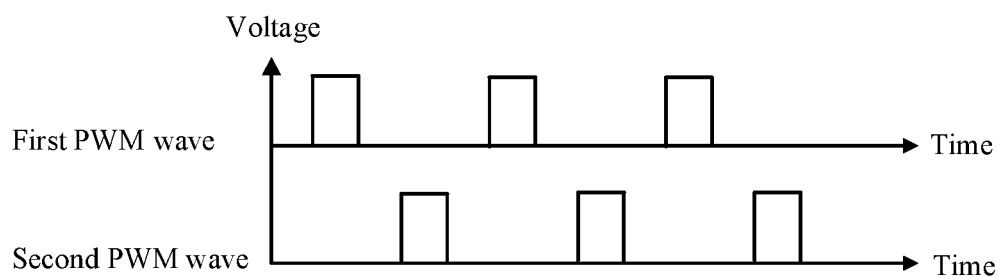
FIG. 11 is a waveform diagram of a first PWM wave and a second PWM wave according to this application.

A difference between FIG. 12 and FIG. 11 lies in that the first PWM wave and the second PWM wave in FIG. 12 are mutually complementary. When a controller controls a second switching transistor Q3 by using the first PWM wave and controls a third switching transistor Q4 by using the second PWM wave, a case in which the second switching transistor Q3 and the third switching transistor Q4 are cut off at the same time does not occur, in other words, there is always a case in which one of the second switching transistor Q3 and the third switching transistor Q4 is conducted and the other one is cut off, so that resonance energy of an output end of a buck-boost circuit 801 can be reversely leaked to a photovoltaic module 802 quickly, and then a voltage between C and D is quickly reduced to a preset voltage.

Figure 13:
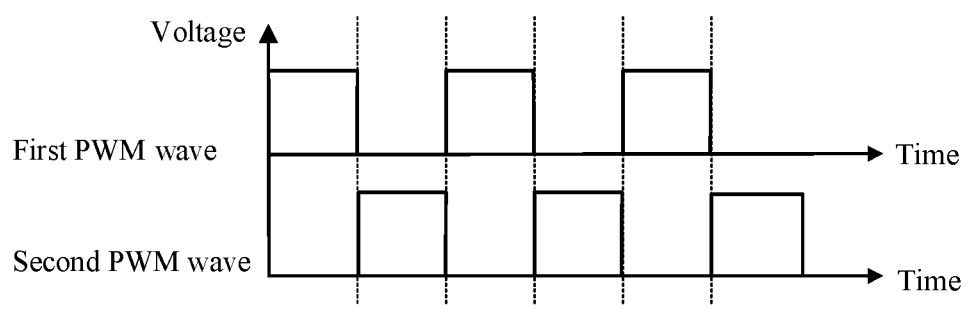
FIG. 13 is a waveform diagram in which a first PWM wave and a second PWM are mutually complementary and have a same duty cycle.

Reference may also be made to FIG. 13. FIG. 13 is a waveform diagram in which a first PWM wave and a second PWM are mutually complementary and have a same duty cycle.

A difference between the figure and FIG. 12 lies in that the first PWM wave and the second PWM wave in FIG. 13 are mutually complementary and have a same duty cycle of 50%.

With reference to the accompanying drawings, the following describes a specific implementation in which another photovoltaic converter operates in a reverse buck mode.

A controller controls a first switching transistor Q1 to be conducted, controls both a fifth switching transistor Q2 and a third switching transistor Q4 to be cut off, and controls a second switching transistor Q3 by using a third PWM wave.

Figure 14:
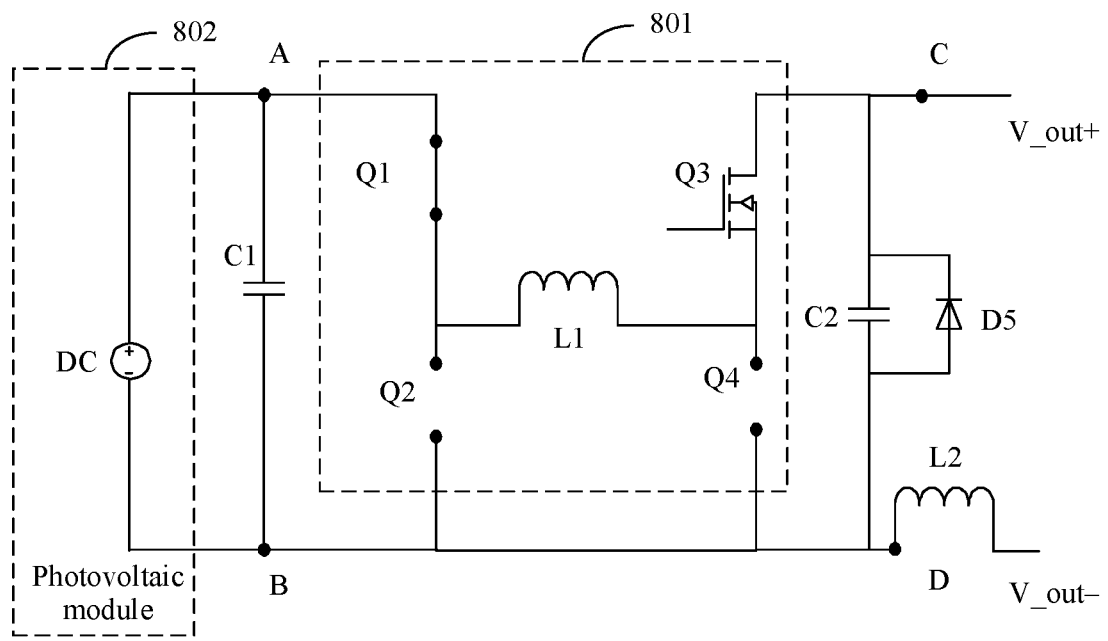
FIG. 14 is an equivalent circuit diagram of still another photovoltaic converter according to Embodiment 4 of this application.

FIG. 14 is an equivalent circuit diagram of still another photovoltaic converter according to Embodiment 4 of this application.

To prevent a bypass diode D5 from being broken down when the photovoltaic converter is hot-inserted, when a controller determines that an output voltage of a buck-boost circuit 801 is greater than or equal to a preset voltage, the controller controls a first switching transistor Q1 to be conducted, and controls both a fifth switching transistor Q2 and a third switching transistor Q3 to be cut off, as shown in FIG. 14.

When the photovoltaic converter is hot-inserted into the circuit due to a misoperation, because there is a voltage on an inverter side connected to an output end of the photovoltaic converter, a capacitor C2 and an inductor L2 at the output end of the photovoltaic converter generate series resonance, causing an increase in a voltage between two points C and D. When the controller determines that the voltage between the two points C and D is greater than the preset voltage, the controller controls the first switching transistor Q1 in the buck-boost circuit 801 to remain conducted, controls both the fifth switching transistor Q2 and the third switching transistor Q4 to be cut off, and controls a second switching transistor Q3 by using a third PWM wave, so that the buck-boost circuit operates in a reverse buck mode. When the third PWM is used to control the second switching transistor Q3 to be conducted, resonance energy of the output end of the buck-boost circuit 801 can be reversely leaked to a photovoltaic module 802, so that the voltage between C and D is reduced to the preset voltage. In this way, a voltage that the bypass diode D5 withstands is restricted to be less than or equal to the preset voltage, thereby preventing the bypass diode D5 from being damaged because the bypass diode D5 withstands an excessively high output voltage. A duty cycle of the third PWM wave is not specifically limited in this embodiment of this application.

Method Embodiment 1

Based on the photovoltaic converter strings provided in Embodiment 1 and Embodiment 2, this embodiment of this application further provides a method for controlling a photovoltaic converter string. The following provides detailed descriptions with reference to the accompanying drawings.

The method is used to control a photovoltaic converter string. The photovoltaic converter string includes a plurality of photovoltaic converters, output ends of the plurality of photovoltaic converters are connected in series, and an input end of each of the photovoltaic converters is connected to a corresponding photovoltaic module. A quantity of photovoltaic converters included in the photovoltaic converter string is not specifically limited in the method. In an actual distributed photovoltaic power system to which the method is applied, one inverter may correspond to one photovoltaic converter string, or one inverter may correspond to a plurality of photovoltaic converter strings. When one inverter corresponds to a plurality of photovoltaic converter strings, output ends of the plurality of photovoltaic converter strings are connected in parallel and connected to an output end of the inverter. An input end of each photovoltaic converter is connected to a corresponding photovoltaic module, and each photovoltaic converter includes a buck/boost circuit and a controller.

The method includes the following steps:

When the buck/boost circuit is in an off state, controlling, to be conducted, one switching transistor in switching transistors in the buck/boost circuit that are connected in parallel to a bypass diode, and controlling the other switching transistors in the buck/boost circuit to be cut off, so that a voltage that the bypass diode withstands is less than or equal to a breakdown voltage of the non-conducted switching transistor.

There may be at least two switching transistors on an output side of the buck/boost circuit that are connected in parallel to the bypass diode. A clamping function for the bypass diode can be implemented provided that one of the switching transistors is controlled to be conducted and the other switching transistors are controlled to be cut off.

For specific implementation of the method in the photovoltaic converter string, refer to related text descriptions corresponding to FIG. 2 to FIG. 7. Details are not described herein again.

In the method provided in this embodiment of this application, one of switching transistors in a buck/boost circuit of a photovoltaic converter that are connected in parallel to the bypass diode may be controlled to be conducted, and the other switching transistors in the buck/boost circuit of the photovoltaic converter may also be controlled to be cut off. In other words, a switching transistor in a buck circuit is controlled to be cut off, one switching transistor that is on an output side of the buck/boost circuit and that is connected in parallel to the bypass diode is controlled to be conducted, and another switching transistor connected in parallel to the bypass diode is controlled to be cut off. Therefore, an output voltage of the photovoltaic converter is applied to both ends of the non-conducted switching transistor on the output side, and after the output voltage of the photovoltaic converter reaches a breakdown voltage of the non-conducted switching transistor, an avalanche breakdown occurs on the non-conducted switching transistor, the switching transistor undergoing the breakdown dissipates excess energy in a form of heat, and a voltage of both ends of the bypass diode connected to a positive output end and a negative output end of the photovoltaic converter is clamped to be less than or equal to the breakdown voltage of the switching transistor. In this way, the voltage that the bypass diode withstands is less than or equal to the breakdown voltage of the non-conducted switching transistor, thereby preventing the bypass diode from withstanding an excessively high output voltage and preventing the bypass diode from being damaged due to an excessively high output voltage.

Method Embodiment 2

Based on the photovoltaic converter strings provided in Embodiment 3 and Embodiment 4, this embodiment of this application further provides a method for controlling a photovoltaic converter string. The following provides detailed descriptions with reference to the accompanying drawings.

Figure 15:
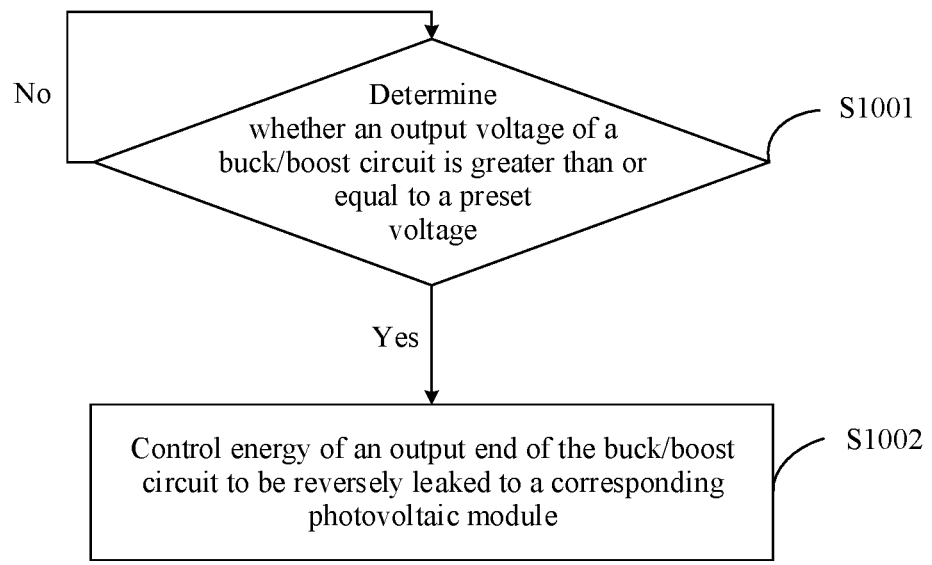
FIG. 15 is a flowchart of a method for controlling a photovoltaic converter string according to an embodiment of this application.

FIG. 15 is a flowchart of a method for controlling a photovoltaic converter string according to an embodiment of this application.

The method is used to control a photovoltaic converter string. The photovoltaic converter string includes a plurality of photovoltaic converters, output ends of the plurality of photovoltaic converters are connected in series, and an input end of each of the photovoltaic converters is connected to a corresponding photovoltaic module. A quantity of photovoltaic converters included in the photovoltaic converter string is not specifically limited in the method. In an actual distributed photovoltaic power system to which the method is applied, one inverter may correspond to one photovoltaic converter string, or one inverter may correspond to a plurality of photovoltaic converter strings. When one inverter corresponds to a plurality of photovoltaic converter strings, output ends of the plurality of photovoltaic converter strings are connected in parallel and connected to an output end of the inverter. An input end of each photovoltaic converter is connected to a corresponding photovoltaic module, and each photovoltaic converter includes a buck/boost circuit and a controller.

The method includes the following operations:

S1001: When the buck/boost circuit is in an off state, determine whether an output voltage of the buck/boost circuit is greater than or equal to a preset voltage.

If yes, S1002 is performed: Control energy of an output end of the buck/boost circuit to be reversely leaked to the corresponding photovoltaic module.

Figure 17:
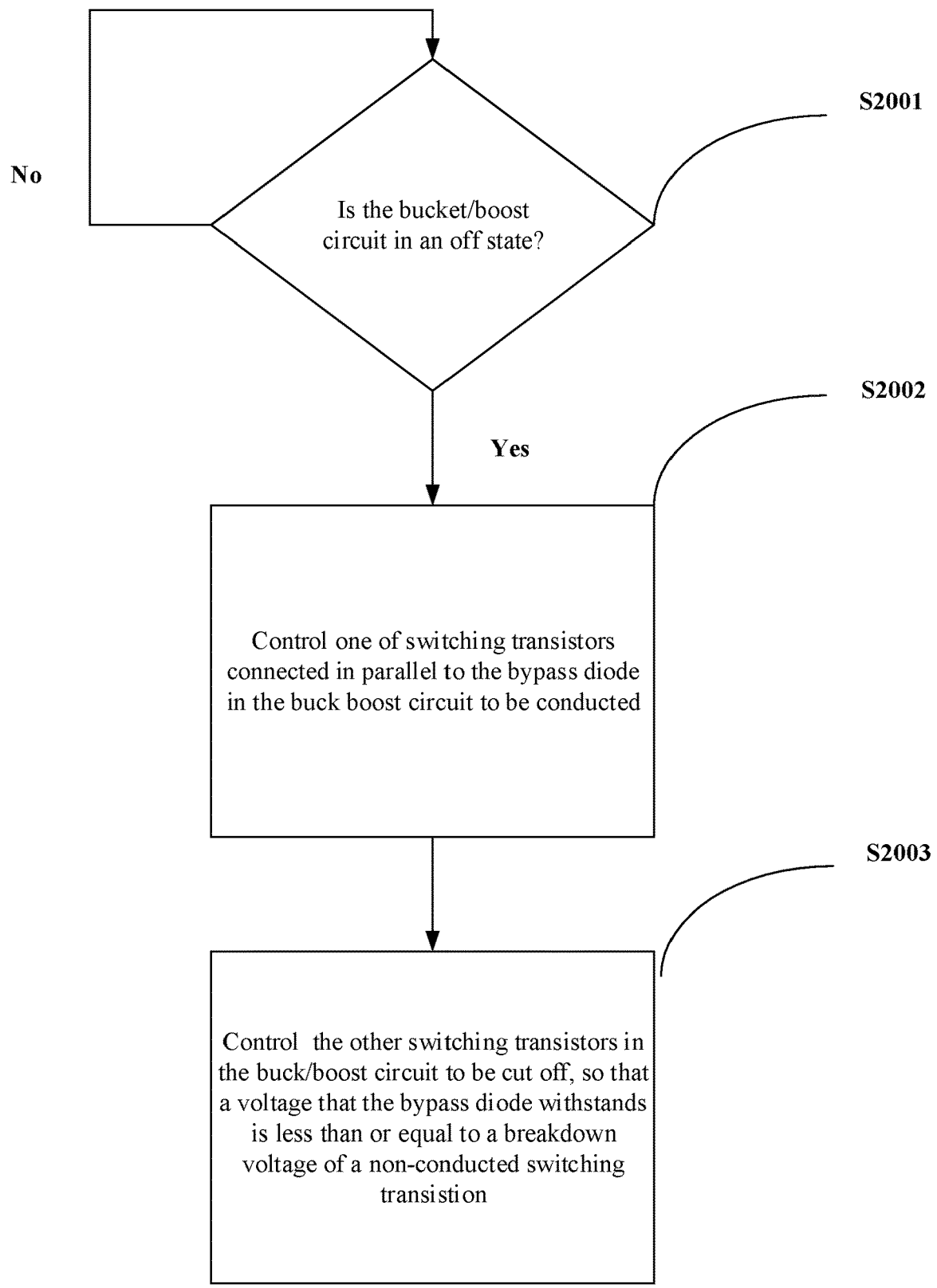
FIG. 17 is a flowchart of another method for controlling a photovoltaic converter string according to an embodiment of this application.

According to FIG. 17, the method may includes the following operations:

S2001: Determining whether the buck/boost circuit is in an off state.

S2002: When the buck/boost circuit is in the off state, control, one of switching transistors in the buck/boost circuit to be conducted, wherein the switching transistors are connected in parallel to the bypass diode.

S2003: Control the other switching transistors in the buck/boost circuit to be cut off, so that a voltage that the bypass diode withstands is less than or equal to a breakdown voltage of a non-conducted switching transistor.

For specific implementation of the method in the photovoltaic converter string, refer to related descriptions of FIG. 8 to FIG. 13. Details are not described herein again.

In addition, this application further provides a photovoltaic converter string. When it is determined that an output voltage of a buck/boost circuit is greater than or equal to a preset voltage, energy of an output end of the buck/boost circuit is controlled to be reversely leaked to a corresponding photovoltaic module, in other words, energy of an output end of a photovoltaic converter is controlled to be leaked to the photovoltaic module connected to an input end, and an output voltage of the photovoltaic converter is clamped by using the photovoltaic module, so that a voltage that a bypass diode withstands is reduced.

System Embodiment

Based on the photovoltaic converter string and the control method provided in the foregoing embodiments, this embodiment of this application further provides a photovoltaic system. The following provides detailed descriptions with reference to the accompanying drawings.

The system includes the photovoltaic converter string described in any one of Embodiment 1 to Embodiment 4, and the system further includes an inverter.

Figure 16:
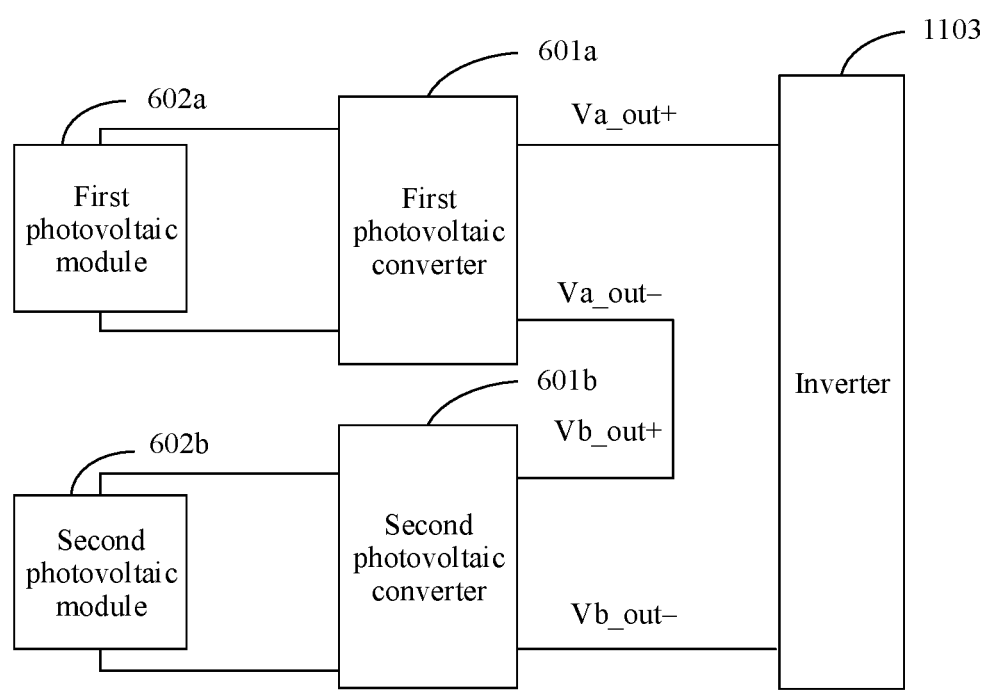
FIG. 16 is a schematic diagram of a photovoltaic system according to an embodiment of this application.

FIG. 16 is a schematic diagram of a photovoltaic system according to an embodiment of this application.

The system includes the photovoltaic converter string described in any one of the foregoing embodiments, and further includes an inverter 1103.

A positive output end Va_out+ of a first photovoltaic converter 601a is connected to a positive input end of the inverter 1103, and a negative output end Va_out− of a second photovoltaic converter 601a is connected to a negative input end of the inverter 1103.

Each photovoltaic converter included in the system includes a buck/boost circuit and a controller.

The controller in the system may be further configured to control, to be conducted, one of switching transistors in a buck/boost circuit of a photovoltaic converter that are connected in parallel to the bypass diode, and also control the other switching transistors in the buck/boost circuit of the photovoltaic converter to be cut off. In other words, a switching transistor in a buck circuit is controlled to be cut off, one switching transistor that is on an output side of the buck/boost circuit and that is connected in parallel to the bypass diode is controlled to be conducted, and another switching transistor connected in parallel to the bypass diode is controlled to be cut off. Therefore, an output voltage of the photovoltaic converter is applied to both ends of the non-conducted switching transistor on the output side, and after the output voltage of the photovoltaic converter reaches a breakdown voltage of the non-conducted switching transistor, an avalanche breakdown occurs on the non-conducted switching transistor, the switching transistor undergoing the breakdown dissipates excess energy in a form of heat, and a voltage of both ends of the bypass diode connected to a positive output end and a negative output end of the photovoltaic converter is clamped to be less than or equal to the breakdown voltage of the switching transistor. In this way, the voltage that the bypass diode withstands is less than or equal to the breakdown voltage of the non-conducted switching transistor, thereby preventing the bypass diode from withstanding an excessively high output voltage and preventing the bypass diode from being damaged due to an excessively high output voltage.

In addition, the controller in the system may be further configured to: when it is determined that an output voltage of a buck/boost circuit is greater than or equal to a preset voltage, control energy of an output end of the buck/boost circuit to be reversely leaked to a corresponding photovoltaic module, in other words, control energy of an output end of a photovoltaic converter to be leaked to the photovoltaic module connected to an input end, and an output voltage of the photovoltaic converter is clamped by using the photovoltaic module, so that a voltage that a bypass diode withstands is reduced.

It should be understood that, in this application, "at least one" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist. A and B may be singular or plural. The character "/" usually indicates an "or" relationship between the associated objects. "At least one of the following" or a similar expression thereof indicates any combination of the items, including any combination of one or more of the items. For example, at least one of a, b, or c may indicate a, b, c, "a and b", "a and c", "b and c", or "a, b, and c", and a, b, and c may be singular or plural.

The foregoing descriptions are merely preferable embodiments of this application, but are not intended to limit this application. Although the example embodiments of this application are disclosed above, the embodiments are not intended to limit this application. By using the method and the technical content disclosed above, a person of ordinary skill in the art can make a plurality of possible changes and modifications on the technical solutions of the present invention, or amend the technical solutions thereof to be embodiments with equal effects through equivalent variations without departing from the protection scope of the technical solutions of the present invention. Therefore, any simple modification, equivalent change, or modification made to the foregoing embodiments or to the technical essence of the present invention without departing from the content of the technical solutions of the present invention shall fall within the protection scope of the technical solutions of the present invention.

What is claimed is:

1. A photovoltaic converter string, comprising a plurality of photovoltaic converters, wherein output ends of the plurality of photovoltaic converters are connected in series, and an input end of each of the photovoltaic converters is connected to a corresponding photovoltaic module;

each photovoltaic converter comprises a buck/boost circuit and a controller, an output capacitor is connected between a positive output end and a negative output end of the buck/boost circuit, and both ends of the output capacitor are connected in parallel to a bypass diode; and the controller is configured to: determine whether the buck/boost circuit is in an off state;

based on the buck/boost circuit being in the off state, the controller is configured to:

control, one of switching transistors in the buck/boost circuit to be conducted, wherein the switching transistors are connected in parallel to the bypass diode; and control the other switching transistors in the buck/boost circuit to be cut off, so that a voltage that the bypass diode withstands is less than or equal to a breakdown voltage of a non-conducted switching transistor;

further based on a condition that an output voltage of the buck/boost circuit is greater than or equal to a preset voltage, control energy of an output end of the buck/boost circuit to be reversely leaked to the correspondingly connected photovoltaic module, to reduce a voltage that the bypass diode withstands; and wherein the off state indicates that the controller included in the photovoltaic converter has not received a start instruction sent by a host computer, and the host computer is a controller of an inverter.

2. The photovoltaic converter string according to claim 1, wherein the buck/boost circuit comprises at least a first switching transistor, a second switching transistor, a third switching transistor, and an inductor.

3. The photovoltaic converter string according to claim 2, wherein a first end of the first switching transistor is connected to a positive input end of the buck/boost circuit, and a second end of the first switching transistor is connected to the positive output end of the buck/boost circuit by using the inductor and the second switching transistor that are sequentially connected in series to the second end of the first switching transistor;

a first end of the third switching transistor is connected to a common end of the inductor and the second switching transistor, and a second end of the third switching transistor is connected to the negative output end of the buck/boost circuit; and a negative input end of the buck/boost circuit is connected to the negative output end of the buck/boost circuit.

4. The photovoltaic converter string according to claim 2, wherein that the controller controls one switching transistor in a boost circuit in the buck/boost circuit to be conducted, and controls the other switching transistors in the buck/boost circuit to be cut off comprises:

the controller controls the second switching transistor to be conducted, and controls both the first switching transistor and the third switching transistor to be cut off.

5. The photovoltaic converter string according to claim 2, wherein that the controller controls one switching transistor in a boost circuit in the buck/boost circuit to be conducted, and controls the other switching transistors in the buck/boost circuit to be cut off comprises:

the controller controls the third switching transistor to be conducted, and controls both the first switching transistor and the second switching transistor to be cut off.

6. A photovoltaic converter string, comprising a plurality of photovoltaic converters, wherein output ends of the plurality of photovoltaic converters are connected in series, and an input end of each of the photovoltaic converters is connected to a corresponding photovoltaic module;

wherein each photovoltaic converter comprises a buck/boost circuit and a controller, an output capacitor is connected between a positive output end and a negative output end of the buck/boost circuit, and both ends of the output capacitor are connected in parallel to a bypass diode;

wherein the controller is configured to: based on the buck/boost circuit being in an off state and an output voltage of the buck/boost circuit being greater than or equal to a preset voltage, control energy of an output end of the buck/boost circuit to be reversely leaked to the correspondingly connected photovoltaic module, to reduce a voltage that the bypass diode withstands; and wherein the off state indicates that the controller included in the photovoltaic converter has not received a start instruction sent by a host computer, and the host computer is a controller of an inverter.

7. The photovoltaic converter string according to claim 6, wherein the buck/boost circuit comprises a first switching transistor, a second switching transistor, a third switching transistor, and an inductor.

8. The photovoltaic converter string according to claim 7, wherein a first end of the first switching transistor is connected to a positive input end of the buck/boost circuit, and a second end of the first switching transistor is connected to the positive output end of the buck/boost circuit by using the inductor and the second switching transistor that are sequentially connected in series to the second end of the first switching transistor;

a first end of the third switching transistor is connected to a common end of the inductor and the second switching transistor, and a second end of the third switching transistor is connected to a negative input end of the buck/boost circuit; and the negative input end of the buck/boost circuit is connected to the negative output end of the buck/boost circuit.

9. The photovoltaic converter string according to claim 7, wherein that the controller controls energy of an output end of the buck/boost circuit to be reversely leaked to the corresponding photovoltaic module comprises:

the controller controls both the first switching transistor and the second switching transistor to be conducted and both the fifth switching transistor and the third switching transistor to be cut off.

10. The photovoltaic converter string according to claim 7, wherein that the controller controls energy of an output end of the buck/boost circuit to be reversely leaked to the correspondingly connected photovoltaic module comprises:

the controller controls the first switching transistor to be conducted, controls the second switching transistor by using a first pulse width modulation (PWM) wave, and controls the third switching transistor by using a second PWM wave, wherein the first PWM wave and the second PWM wave are mutually complementary.

11. The photovoltaic converter string according to claim 7, wherein that the controller controls energy of an output end of the buck/boost circuit to be reversely leaked to the correspondingly connected photovoltaic module comprises:

the controller controls the first switching transistor to be conducted, controls both the fifth switching transistor and the third switching transistor to be cut off, and controls the second switching transistor by using a third pulse width modulation (PWM) wave.

12. A method for controlling a photovoltaic converter string, wherein the photovoltaic converter string comprises a plurality of photovoltaic converters, output ends of the plurality of photovoltaic converters are connected in series, an input end of each of the photovoltaic converters corresponds to a connected photovoltaic module, each photovoltaic converter comprises a buck/boost circuit and a controller, an output capacitor is connected between a positive output end and a negative output end of the buck/boost circuit, and both ends of the output capacitor are connected in parallel to a bypass diode; and the method comprises:

determining whether the buck/boost circuit is in an off state:

based on the buck/boost circuit being in the off state, controlling, one of switching transistors in the buck/boost circuit to be conducted, wherein the switching transistors are connected in parallel to the bypass diode; and controlling the other switching transistors in the buck/boost circuit to be cut off, so that a voltage that the bypass diode withstands is less than or equal to a breakdown voltage of the non-conducted switching transistor;

further based on a condition that an output voltage of the buck/boost circuit is greater than or equal to a preset voltage, controlling energy of an output end of the buck/boost circuit to be reversely leaked to the correspondingly connected photovoltaic module, to reduce a voltage that the bypass diode withstands; and wherein the off state indicates that the controller included in the photovoltaic converter has not received a start instruction sent by a host computer, and the host computer is a controller of an inverter.

13. The method according to claim 12, wherein the buck/boost circuit comprises at least a first switching transistor, a second switching transistor, a third switching transistor, and an inductor; and that the controller controls one switching transistor in a boost circuit in the buck/boost circuit to be conducted, and controls the other switching transistors in the buck/boost circuit to be cut off comprises:

the controller controls the second switching transistor to be conducted, and controls both the first switching transistor and the third switching transistor to be cut off.

14. The method according to claim 12, wherein the buck/boost circuit comprises at least a first switching transistor, a second switching transistor, a third switching transistor, and an inductor; and that the controller controls one switching transistor in a boost circuit in the buck/boost circuit to be conducted, and controls the other switching transistors in the buck/boost circuit to be cut off comprises:

the controller controls the third switching transistor to be conducted, and controls both the first switching transistor and the second switching transistor to be cut off.

15. The method according to claim 12, wherein the buck/boost circuit comprises a first switching transistor, a second switching transistor, a third switching transistor, and an inductor; and that the controller controls energy of an output end of the buck/boost circuit to be reversely leaked to the corresponding photovoltaic module comprises:

the controller controls both the first switching transistor and the second switching transistor to be conducted and both the fifth switching transistor and the third switching transistor to be cut off.

16. The method according to claim 12, wherein the buck/boost circuit comprises a first switching transistor, a second switching transistor, a third switching transistor, and an inductor; and that the controller controls energy of an output end of the buck/boost circuit to be reversely leaked to the correspondingly connected photovoltaic module comprises:

the controller controls the first switching transistor to be conducted, controls the second switching transistor by using a first pulse width modulation (PWM) wave, and controls the third switching transistor by using a second PWM wave, wherein the first PWM wave and the second PWM wave are mutually complementary.

17. The method according to claim 12, wherein the buck/boost circuit comprises a first switching transistor, a second switching transistor, a third switching transistor, and an inductor; and that the controller controls energy of an output end of the buck/boost circuit to be reversely leaked to the correspondingly connected photovoltaic module comprises:

the controller controls the first switching transistor to be conducted, controls both the fifth switching transistor and the third switching transistor to be cut off, and controls the second switching transistor by using a third pulse width modulation (PWM) wave.

\* \* \* \* \*

UNITED STATES PATENT AND TRADEMARK OFFICE
CERTIFICATE OF CORRECTION

| | | |
|---|---|---|
| PATENT NO. | : 11,605,951 B2 | Page 1 of 1 |
| APPLICATION NO. | : 17/362119 | |
| DATED | : March 14, 2023 | |
| INVENTOR(S) | : Gao et al. | |

It is certified that error appears in the above-identified patent and that said Letters Patent is hereby corrected as shown below:

In the Claims

Claim 12: Column 22, Line 3: "state." should read -- state; --.

Signed and Sealed this
Twenty-seventh Day of June, 2023

Katherine Kelly Vidal
*Director of the United States Patent and Trademark Office*